July 16, 1935.  J. McCLURE  2,008,622

TIRE PRESSURE INDICATOR

Filed Aug. 14, 1934

Jack McClure,
INVENTOR

BY Victor J. Evans & Co.
ATTORNEY

P. J. Hickey
WITNESS

Patented July 16, 1935

2,008,622

UNITED STATES PATENT OFFICE 2,008,622

FIRE PRESSURE INDICATOR

Jack McClure, Poteau, Okla., assignor of fifty-five per cent to N. P. Wood, Poteau, Okla.

Application August 14, 1934, Serial No. 739,781

4 Claims. (Cl. 116—34)

This invention relates to an operating mechanism for tire pressure indicators and has for the primary object the provision of a device of this character which will be simple in construction and durable and may be readily applied to a motor vehicle wheel without undue alterations in the construction of the latter.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a fragmentary sectional view showing my invention applied to the rim and tire of a motor vehicle wheel.

Figure 1:
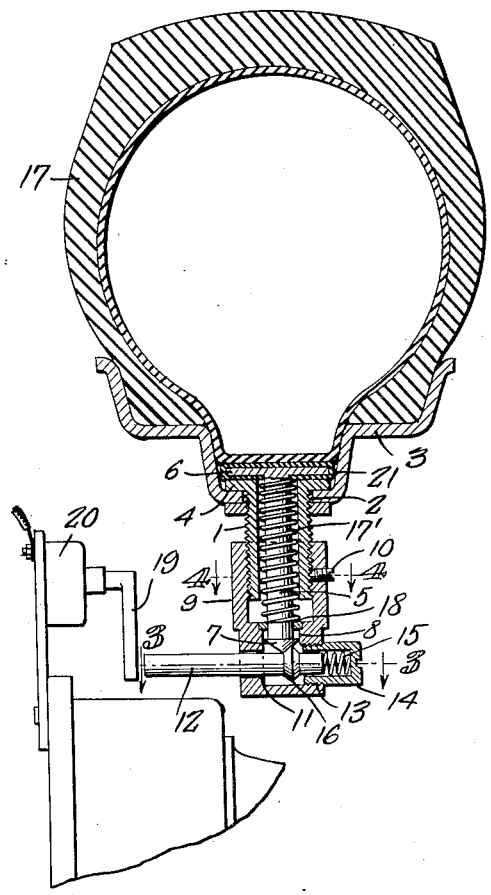
Figure 2:
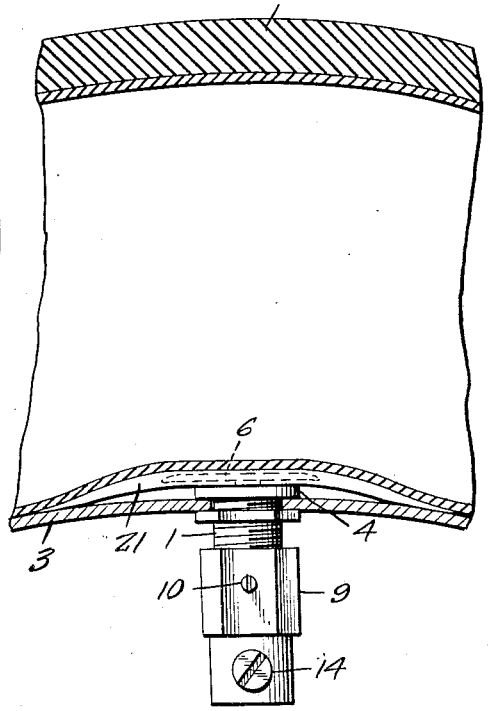
Figure 2 is a fragmentary vertical sectional view showing the operating mechanism in elevation with the tire and rim in section.
Figure 3:
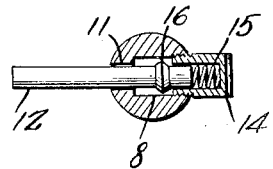
Figure 3 is a detail sectional view taken on the line 3—3 of Figure 1.
Figure 4:
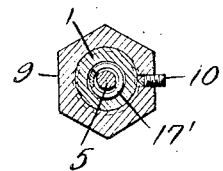
Figure 4 is a sectional view taken on the line 4—4 of Figure 1.

Referring in detail to the drawing, the numeral 1 indicates an exteriorly screw threaded sleeve to pass through an opening 2 of a pneumatic tire rim 3 and has integral with one end a flange 4 bearing against the rim. A plunger or stem 5 is slidably mounted in the sleeve 1 and has integral with one end a flange 6 overlying the flange 4 while the opposite end is reduced or of conical shape, as shown at 7. The end 7 of the stem or plunger extends outwardly of the sleeve 1 and is received in a chamber 8 of a body 9. The chamber 8 extends through one end of the body and is internally screw threaded to be threaded onto the sleeve 1 and held against unthreading from said sleeve by a set bolt or pin 10. The body 9 adjacent one end is provided with an opening 11 communicative with the chamber to slidably receive a switch operating rod 12. The body 9 is also provided with a screw threaded opening 13 arranged opposite to the opening 11 and has threaded therein a spring seat 14 which slidably receives one end of the rod 12 and the last-named end is engaged by a coil spring 15 which engages with the seat 14. A raised or annular portion 16 is formed on the rod 12 and operates in the chamber 8 and has oppositely arranged beveled faces to be engaged by the conical shaped end 7 of the stem or plunger 5 and when the latter is positioned by normal air pressure in the tire 17 carried by the rim 3 engages one of the beveled faces of the raised portion 16 and retains the rod 12 against outward movement from the body by the action of the spring 15. A coil spring 17' surrounds the stem 5 and bears against the flange 6 and a seat 18 formed in the body. The spring 17' is comparatively weak while the spring 15 is comparatively strong and the strength of the latter may be varied by adjusting the seat 14 relative to the body 9.

The rod 12 is arranged to extend at right angles to the body 9 and when engaging the annular portion 16 is engaged by the plunger or stem 5 under the influence of the air pressure in the tire and said rod will be positioned out of the path of an actuating arm 19 of an electric switch 20 employed for the control of an electric circuit forming a part of a tire signal device. However, when the air pressure in the tire decreases below a predetermined amount, the spring 15 acts to urge the rod 12 in a direction to position said rod to engage with the switch arm 19 during the rotation of the wheel so that the switch will be actuated for closing the circuit and thereby setting the signal in operation to warn the operator that the tire is losing air pressure.

The flange 6 has a cover 21 engaged by the inner tube of the tire and is adapted to prevent chafing or injury to the inner tube.

Having described the invention, I claim:

1. An operating mechanism for tire pressure indicators comprising an externally threaded sleeve extending through an opening in a tire rim and having a flanged end to engage with the rim, a body having a chamber threaded to said sleeve, a stem operating in the sleeve and chamber and having a flanged end to be engaged by the inner tube of a tire, a switch operating rod slidably supported by the body and extending into the chamber to be engaged by the stem, a raised portion on said rod and when engaged by the stem adapted to position the rod out of the path of an actuating arm to a circuit controlling switch of an electric switch, and a spring engaging said rod to position the latter to engage with the switch arm on the lowering of the air pressure in the tire below a predetermined amount.

2. An operating mechanism for tire pressure indicators comprising an externally threaded sleeve extending through an opening in a tire rim and having a flanged end to engage with the rim, a body having a chamber threaded to said sleeve, a stem operating in the sleeve and chamber and having a flanged end to be engaged by the inner tube of a tire, a switch operating rod slidably supported by the body and extending into the chamber to be engaged by the stem, a raised portion on said rod and when engaged by the stem adapted to position the rod out of the path of an actuating arm to a circuit controlling switch of an electric signal, a spring engaging said rod to position the latter to engage with the switch arm on the lowering of the air pressure in the tire below a predetermined amount, a spring on the stem and engaging at one end the flanged end of the stem, a seat in the body engaged by the other end of the second-named spring.

3. An operating mechanism for tire pressure indicators comprising an externally threaded sleeve extending through an opening in a tire rim and having a flanged end to engage with the rim, a body having a chamber threaded to said sleeve, a stem operating in the sleeve and chamber and having a flanged end to be engaged by the inner tube of the tire, a switch operating rod slidably supported by the body and extending into the chamber to be engaged by the stem, a raised portion on said rod and when engaged by the stem adapted to position the rod out of the path of an actuating arm of a circuit controlling switch of an electric alarm, a spring engaging said rod to position the latter to engage with the switch arm on the lowering of the air pressure in the tire below a predetermined amount, a spring on the stem and engaging at one end the flanged end of the stem, a seat in the body engaged by the other end of the second-named spring, an adjustable seat carried by the body for the first-named spring whereby the tension of the latter may be varied.

4. An operating mechanism for tire pressure indicators comprising an externally threaded sleeve extending through an opening in a tire rim and having a flanged end to engage with the rim, a body having a chamber threaded to said sleeve, a stem operating in the sleeve and chamber and having a flanged end to be engaged by the inner tube of a tire, a switch operating rod slidably supported by the body and extending into the chamber to be engaged by the stem, a raised portion on said rod and when engaged by the stem adapted to position the rod out of the path of an actuating arm of a circuit controlling switch of an electric alarm, a spring engaging said rod to position the latter to engage with the switch arm on the lowering of the air pressure in the tire below a predetermined amount, a spring on the stem and engaging at one end the flanged end of the stem, a seat in the body engaged by the other end of the second-named spring, an adjustable seat carried by the body for the first-named spring whereby the tension of the latter may be varied, and a covering for the flanged end of the stem to protect the inner tube of the tire.

JACK McCLURE.

CERTIFICATE OF CORRECTION.

Patent No. 2,008,622.                                July 16, 1935.

JACK McCLURE.

It is hereby certified that error appears in the heading to the printed specification of the above numbered patent requiring correction as follows: Line 2, title of invention, for "FIRE PRESSURE INDICATOR" read TIRE PRESSURE INDICATOR; and that the said Letters Patent should be read with this correction therein that the same may conform to the record of the case in the Patent Office.

Signed and sealed this 27th day of August, A. D. 1935.

Leslie Frazer (Seal)                                                   Acting Commissioner of Patents.